(12) United States Patent
Percy et al.

(10) Patent No.: US 8,407,976 B2
(45) Date of Patent: Apr. 2, 2013

(54) GRASS CATCHER MOUNTING DEVICE FOR REEL MOWER CUTTING UNIT

(75) Inventors: Richard F. Percy, Fuquay-Varina, NC (US); John D. Pope, Sr., Clayton, NC (US); Joshua J. McCormick, Charlotte, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/020,105

(22) Filed: Jan. 25, 2008

(65) Prior Publication Data

US 2009/0188230 A1    Jul. 30, 2009

(51) Int. Cl.
*A01D 43/06*    (2006.01)

(52) U.S. Cl. .................................. 56/199; 56/5

(58) Field of Classification Search ............... 56/7, 194, 56/198–200, 202–206, 5; 248/316.8, 690, 248/691
See application file for complete search history.

(56) References Cited

U.S. PATENT DOCUMENTS

| | | | | |
|---|---|---|---|---|
| 939,068 | A * | 11/1909 | McGrath | 56/199 |
| 2,475,671 | A | 7/1949 | McCartney | |
| 2,932,146 | A * | 4/1960 | Campbell | 56/202 |
| 3,099,122 | A * | 7/1963 | Sakatani | 56/199 |
| 3,110,147 | A | 11/1963 | Barth | |
| 3,197,949 | A * | 8/1965 | Waag | 56/202 |
| 3,408,801 | A | 11/1968 | Kroll | |
| 3,513,649 | A * | 5/1970 | Berg | 56/202 |
| 3,624,699 | A * | 11/1971 | Hoffmann | 56/202 |
| 3,691,740 | A * | 9/1972 | Weber | 56/198 |
| 4,738,088 | A * | 4/1988 | Klever et al. | 56/202 |
| 4,774,802 | A * | 10/1988 | Azbell | 56/202 |
| 4,924,663 | A | 5/1990 | Ehn, Jr. et al. | |
| 4,936,083 | A * | 6/1990 | Deutsch | 56/202 |
| 4,970,852 | A | 11/1990 | Check et al. | |
| 5,228,277 | A * | 7/1993 | Smith et al. | 56/16.9 |
| 5,412,931 | A | 5/1995 | Reichen et al. | |
| 5,533,326 | A | 7/1996 | Goman et al. | |
| 6,151,875 | A | 11/2000 | Collins | |
| 6,237,313 | B1 | 5/2001 | Leden | |
| 6,341,478 | B1 | 1/2002 | Sallstrom et al. | |
| 6,487,837 | B1 | 12/2002 | Fillman et al. | |
| 6,622,464 | B2 | 9/2003 | Goman et al. | |
| 6,802,175 | B2 | 10/2004 | Fillman et al. | |
| 7,191,584 | B2 | 3/2007 | Goman et al. | |
| 7,310,930 | B2 | 12/2007 | Percy et al. | |
| 2002/0095922 | A1* | 7/2002 | Goman et al. | 56/16.7 |
| 2005/0120697 | A1* | 6/2005 | Percy et al. | 56/202 |
| 2006/0123761 | A1* | 6/2006 | Goman et al. | 56/156 |
| 2006/0168929 | A1* | 8/2006 | Phillips | 56/7 |

OTHER PUBLICATIONS

John Deere, 2500 Professional Greensmower, Operator's Manual, Copyright 1998, 22 pages, Horicon, WI, USA.
John Deere, 2500 Professional Greensmower, Parts Catalog, Jan. 1999, 17 pages, USA.

* cited by examiner

*Primary Examiner* — Thomas B Will
*Assistant Examiner* — Joan D Misa

(57) ABSTRACT

A grass catcher mounting device is provided for a reel mower cutting unit, including a pair of outwardly extending pivot rods on the left and right sides of the grass catcher, and a pair of slots in the side panels of the reel mower cutting unit receiving the pivot rods such that the grass catcher can pitch with respect to the reel mower cutting unit. The mounting device also includes a forwardly extending center support on which the grass catcher rests and which supports most of the weight of the grass catcher. The center support allows the grass catcher to pitch, roll and steer or yaw.

6 Claims, 2 Drawing Sheets

GRASS CATCHER MOUNTING DEVICE FOR REEL MOWER CUTTING UNIT

FIELD OF THE INVENTION

This invention relates generally to grass mowing equipment, and more specifically to a grass catcher mounting device for a reel mower cutting unit.

BACKGROUND OF THE INVENTION

In the past, various mounting devices have been used to attach a grass catcher to a reel mower cutting unit. Typically, a grass catcher may be mounted directly in front of a reel mower cutting unit to collect grass clippings discharged from the cutting unit as it moves forward in the mowing position.

Grass mowing machines such as walk behind greensmowers, triplex riding greensmowers, fairway mowers and trim mowers may have reel mower cutting units that can pivot on one or more axes of rotation. For example, each reel mower cutting unit may be mounted to a machine allowing the cutting unit to pitch on a horizontal axis parallel to the reel, roll on a horizontal axis in the direction of travel, and/or yaw or steer on a vertical axis. The pivoting action allows the cutting unit to better follow the ground surface, avoid scalping, and provide a more uniform height of cut.

While a reel mower cutting unit pivots, it is important that the grass catcher remain close enough to the cutting unit so that grass clippings do not fall into a gap between the cutting unit and grass catcher. To accomplish this, some grass catcher mounting devices have been designed to allow the grass catcher to pivot and move along with the reel mower cutting unit. Additionally, some grass catchers are mounted to a separate frame or to the grass mowing machine traction unit so that the reel mower cutting unit itself does not support the weight of the grass catcher.

For example, U.S. Pat. Nos. 5,533,326 and 6,341,478 relate to a triplex greensmower having a grass catcher mounted on a carrier frame in front of each reel mower cutting unit, with a pair of horns supporting the ends of the grass catcher. The '478 patent also relates to a pivot axis connection that is located forwardly and above the cutting unit so the grass catcher can yaw or steer.

Other grass mowing machines have mounting devices in which the reel mower cutting unit substantially supports the grass catcher. These machines include walk behind greensmowers in which the cutting unit helps support the frame or traction unit in the mowing position. Additionally, fairway mowers may have reel mower cutting units that substantially support the weight of both the lift arm and the grass catcher attached to the lift arm.

For example, U.S. Pat. Nos. 4,924,663; 6,487,837 and 6,802,175 relate to a walk behind greensmower having a grass catcher that is slidably mounted onto a pair of tines supported by each side of a reel mower cutting unit. Additionally, U.S. Pat. Nos. 6,622,464 and 7,191,584 relate to a walk behind reel mower with a grass catcher mounted by two transversely spaced sockets on the reel mower frame that receive two rearwardly extending seating pins on the grass catcher.

A grass catcher mounting device offered by Deere & Company on riding greensmowers includes a hook extending forwardly from the traction unit frame, which may be connected to a handle on a bail under the grass catcher. The bail is pivotably mounted to the reel mower cutting unit, allowing the grass catcher to pitch on a horizontal axis with respect to the reel. The handle slides on the hook as the grass catcher yaws or steers with the cutting unit. To install, the grass catcher is positioned on the bail, then the hook is fastened or latched to the handle. To remove the grass catcher, the two actions are reversed.

U.S. Pat. No. 5,412,931 relates to a slidable grass catcher with a laterally extending rail on the cutting unit, and a pair of hooks on the grass catcher that engage the rail. U.S. Pat. No. 6,237,313 relates to a grass catcher support assembly includes upper and lower support members at each side of the cutting unit that support the grass catcher, with cables attached between the upper and lower support members.

Although these grass catcher mounting devices are effective, it is desirable to provide a device that simplifies operator installation and removal of the grass catcher from the machine. For example, a mounting device is needed allowing an operator to install and remove the grass catcher with one hand. There is a need for a grass catcher mounting device that is less complex and costly than existing devices. A grass catcher mounting device is needed having fewer parts, especially those that extend outwardly or forwardly from a reel mower cutting unit and/or grass catcher basket. Additionally, a simple and inexpensive mounting device is needed that allows the grass catcher to pitch, roll and yaw, while minimizing any gap between the reel mower cutting unit and grass catcher during mowing operations.

SUMMARY OF THE INVENTION

A grass catcher mounting device is provided for a reel mower cutting unit, including a center support extending forwardly above the reel mower cutting unit and centrally positioned between the opposing sides of the grass catcher. The center support contacts the underside of the upper wall of the grass catcher to support most of the weight of the grass catcher. A pair of pivot rods extend from the sides of the grass catcher and are inserted into slots on the side panels of the cutting unit, allowing the grass catcher to pitch with respect to the cutting unit.

The mounting mechanism simplifies operator installation and removal, and may be installed and removed with one hand. The mounting device is less complex and costly than existing devices and has fewer parts. The mounting device allows the grass catcher to pitch, roll and yaw, and minimizes any gap between the reel mower cutting unit and grass catcher during mowing operation

DESCRIPTION OF THE PREFERRED EMBODIMENT

Figure 1:
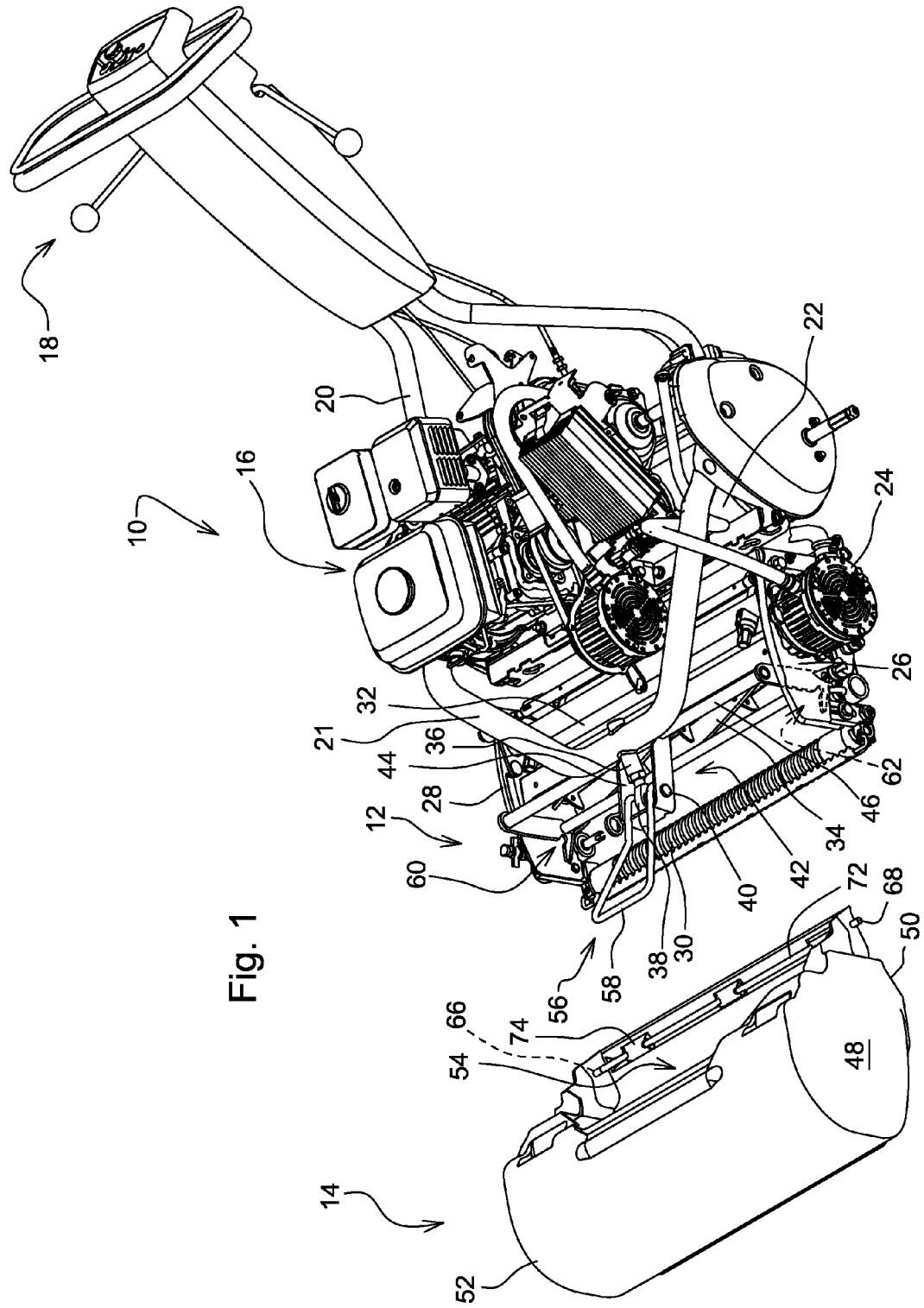
FIG. 1 is an elevated perspective view of a walk behind greensmower with a grass catcher mounting device for a reel mower cutting unit according to one embodiment of the invention, with the grass catcher removed and the left side panel of the reel mower cutting unit partially cut away.
Figure 2:
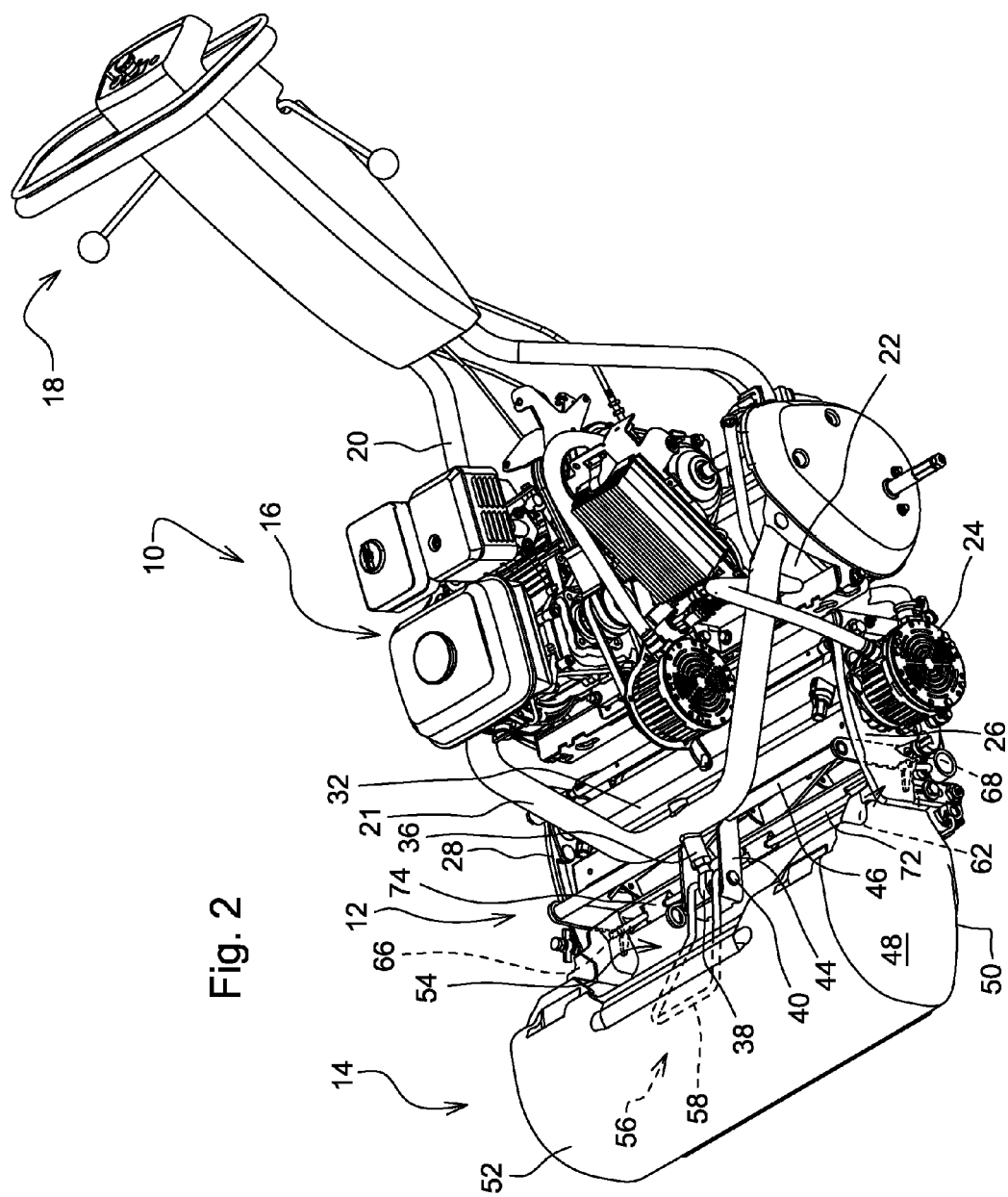
FIG. 2 is an elevated perspective view of a walk behind greensmower with a grass catcher mounting device for a reel mower cutting unit according to one embodiment of the invention, with the grass catcher installed and the left side panel of the reel mower cutting unit partially cut away.

In FIGS. 1-2, walk behind greensmower 10 is shown having reel mower cutting unit 12 and grass catcher 14. The walk behind greensmower may be powered by internal combustion engine 16 or an alternative power source such as an electric battery and motor. The walk behind greensmower also includes handle assembly 18 and frame 20. The frame may include a forwardly extending U-shaped frame member 21. The frame may be supported, at least in part, by traction drum 22 operably coupled to the engine and rotated to move the machine forward during mowing operations. The drive system may include one or more pulleys and/or gears between the engine and traction drum.

Although the grass catcher mounting device is described and shown on a walk behind greensmower, it will be understood by those skilled in the art that the mounting device also may be used on any other grass mowing machine having one or more reel mower cutting units. For example, the grass catcher mounting device may be used for reel mower cutting units on triplex riding greensmowers, fairway mowers, and trim mowers.

In one embodiment, reel mower cutting unit 12 may be rotated by electric motor 24 mounted to one of side panels 26, 28 on the left and right sides of the cutting unit. Alternatively, the reel mower cutting unit may be driven directly or indirectly by the engine through a mechanical or hydrostatic transmission. The reel mower cutting unit rotates about a generally horizontal and laterally extending axis, and is carried by front and rear rollers 30, 32 coupled to the side panels and contacting the ground during mowing operations. Grass may be cut between rotating reel blades of cutting reel 34 and a bedknife mounted between the side panels. The front and rear rollers may be adjusted up or down to change the cutting height. While the reel mower cutting unit is on the ground in the mowing position, the cutting unit helps support the frame.

In one embodiment, U-shaped frame member 21 may have a forward extending portion 36. The forward extending portion may include a ball joint 38 with a transverse rod 40. The opposing ends of transverse rod 40 may be attached to yoke 42, and the ball joint may allow the reel mower cutting unit to pivot on one or more axes. For example, the cutting unit may pitch on a horizontal axis parallel to the reel, roll on a horizontal axis parallel to the direction of travel, and steer or yaw on a vertical axis. Alternatively, the reel mower cutting unit may be pivotably connected to a forward extending portion of a lift arm that is pivotably connected to the frame of a triplex riding greensmower, fairway mower or trim mower.

In one embodiment, yoke 42 may extend forwardly of the cutting unit, and may include U-shaped member 44 connected to crossbar 46. The opposing ends of the crossbar may be attached to the side panels of the reel mower cutting unit. The yoke pulls the cutting unit during mowing operations, allowing the cutting unit to follow the contours of the ground surface and cut grass at a specified height.

In one embodiment, grass catcher 14 may be positioned directly in front of reel mower cutting unit 12. Grass catcher 14 may have opposing sides 48, lower wall or panel 50, and upper wall or panel 52. The upper wall of the grass catcher may have a generally arcuate or curved shape extending between the top of opening 54 and lower wall or panel 50. Opening 54 may face the reel mower cutting unit to receive grass clippings discharged by the cutting unit. The lower wall or panel may extend over the front roller of the cutting unit.

In one embodiment, mounting device 56 includes center support 58 and left and right pivot rods 66, 68. The center support and pair of pivot rods together provide three mounting points for grass catcher 14. The center support may provide all or a high percentage of the support for the weight of the grass catcher and clippings, while the left and right pivot rods help maintain the grass catcher in close proximity to the reel mower cutting unit while allowing the grass catcher to pitch with respect to the cutting unit.

In one embodiment, the center support of the mounting device extends forwardly above the reel mower cutting unit, and is centrally positioned generally between opposing sides 48 of the grass catcher. The center support may fit under the upper wall or panel 52 of the grass catcher, to contact the underside of the grass catcher and support most or all of the weight of the grass catcher along with collected grass clippings. While supporting the grass catcher in the mowing position, the center support member may have a contact width on the underside of the upper wall of the grass catcher of at least about two inches, and not more than about ten inches. For example, the center support may be a U-shaped wire form having a forward portion of about four inches contacting the underside of the upper wall of the grass catcher. The center support may be generally horizontally aligned in the mowing position, and at least part of the center support may be upturned to help retain the grass catcher in place.

In one embodiment, the mounting device may allow the grass catcher to rest on the center support, and also slide on the center support as the grass catcher pivots to accommodate undulations of the ground surface. For example, the grass catcher may pitch, roll, or steer or yaw while mowing, causing the grass catcher to slide on the center support. If a pivoting action causes the grass catcher to slide on the center support, the center support should still remain in place under the upper wall so that it can support most or all of the weight of the grass catcher.

In one embodiment, the underside of the upper wall of the grass catcher may have a channel, slot, indentation or trough over the center support that is dimensioned to retain the grass catcher on the center support, while limiting how far the grass catcher may move or slide on the center support. Alternatively, the center support may include one or more rollers or bearings to help the grass catcher pivot while remaining supported by the center support, and thereby minimize friction and wear between the grass catcher and center support. Additionally, the underside of the upper wall of the grass catcher may have a slot, ledge or bar that may hook to the center support.

In one embodiment, the center support of the mounting device may be rigidly attached to U-shaped frame member 21 or forward extending portion 36 of the frame member. Alternatively, the center support may be pivotably attached to the U-shaped frame member or forward extending portion. For example, the center support may be pivotably attached so that the center support may pitch, roll, and yaw or steer with respect to the frame member.

In one embodiment, the center support of the mounting device may be attached to transverse rod 40 of the ball joint, allowing the center support to pivot with the cutting unit. For example, the ball joint may provide a pivotable connection allowing the center support to pitch with respect to the frame member. The U-shaped portion of the yoke also may provide a stop limiting how far the center support may pitch forward to lower the grass catcher. The center support may pitch backward with the grass catcher, such as when the grass catcher encounters a steep uphill slope in advance of the cutting unit. Additionally, the center support may pitch backward to swing out of the way to reduce the area required for storage or transport of the machine. The ball joint or other pivotable connection also may allow the center support to steer or yaw with the cutting unit and grass catcher, and/or roll with the cutting unit and grass catcher.

In one embodiment, the grass catcher mounting device includes left and right pivot rods 66, 68 that extend from the left and right sides of the grass catcher at or near lower wall or panel 50, under opening 54. The pivot rods may be the opposing ends of bar 72 attached to the lip or leading edge of the grass catcher by retaining structures 74. For example, U.S. Pat. No. 7,310,930 shows a reinforcing bar retained at or near the leading edge of the grass catcher by retaining structures, such as slots molded into the grass catcher's lip or leading edge. The present invention may be implemented by lengthening the reinforcing bar of the '930 patent so that both ends of the bar protrude through the sides of the grass catcher adjacent the lip or leading edge.

In one embodiment, when the grass catcher is installed on the machine, the pivot rods enter slots 60, 62 on the side panels at each side of the reel mower cutting unit. The pivot rods 66, 68 may provide a horizontal pivot axis between the grass catcher and the reel mower cutting unit, parallel to the cutting reel, allowing the grass catcher to pitch with respect to the cutting unit. For example, the grass catcher may pitch independently of the reel mower cutting unit if undulations or obstacles are encountered by the grass catcher before the cutting unit. The pivot rods provide an axis and pivot point that is integral with the grass catcher. The integral pivot point has fewer components than a pivot point provided by a bail under the grass catcher as shown in the prior art.

In one embodiment, slots 60, 62 may be dimensioned so that each pivot rod may shift while remaining mounted in the slot, and without dislodging from the slot. For example, a pivot rod may shift within a slot if the grass catcher pivots on an axis other than the pivot rod itself. The pivot axis of the grass catcher may be the same as the axis of the pivot rods, or may be adjacent the axis of the pivot rods.

In one embodiment, an operator may install the grass catcher by inserting pivot rods 66, 68 into slots 70, 71 in the opposing side panels of the cutting unit, and resting the underside of the top panel on the center support. The slots are easily visible attachment points for the pivot rods. The slots may be inclined forwardly and/or tapered so that an operator can easily install and remove the grass catcher from the mounting device.

The mounting device helps prevent improper positioning of the grass catcher basket. Additionally, the mounting device of the present invention simplifies installation and removal of the grass catcher basket. Installation and removal can be performed with one hand in a single step or motion.

Having described a preferred embodiment, it will become apparent that various modifications can be made without departing from the scope of the invention as defined in the accompanying claims.

The invention claimed is:

1. A grass mowing machine comprising:
    a traction unit having a frame and a drive system moving the frame forward over a ground surface during mowing operations;
    a reel mower cutting unit pivotably connected to a ball joint attached to a portion of the frame extending forwardly of the reel mower cutting unit and which pulls the reel mower cutting unit so that the reel mower cutting unit follows the ground surface independently of the frame;
    a grass catcher having an upper wall pivotably engaged to a central support pivotably attached to and extending forwardly of the ball joint such that the grass catcher pivots independently of the reel mower cutting unit and the frame supports substantially all of the weight of the grass catcher;
    the center support can swing forward until reaching a stop, and can swing backward with the grass catcher during mowing on slopes, or backward without the grass catcher to a storage or transport position behind the ball joint;
    a rod adjacent a lower surface of the grass catcher and engaging a pair of slots in the reel mower cutting unit.

2. The grass mowing machine of claim 1 wherein the rod is a reinforcing member inserted through at least one retaining structure integrally formed with the grass catcher.

3. A grass mowing machine comprising:
    a reel mower cutting unit pivotably suspended rearwardly from a ball joint attached to a frame member which pulls the reel mower cutting unit in a forward direction so that the reel mower cutting unit follows the ground surface;
    a single center support pivotably attached to and extending forwardly from the ball joint ahead of the reel mower cutting unit; the center support engaging a top panel of a grass catcher whereby the center support carries substantially all of the weight of the grass catcher and the grass catcher pivots independently of the reel mower cutting unit;
    the single center support can swing forward until reaching a stop and can swing backward with the grass catcher while mowing on slopes, or backward without the grass catcher behind the ball joint for storage or transport; and
    a rod adjacent a lower surface of the grass catcher and engaging a pair of slots in the reel mower cutting unit.

4. The grass mowing machine of claim 3 wherein the center support is a wire form.

5. The grass mowing machine of claim 3 wherein the frame member is moved forward by traction drum.

6. A grass mowing machine comprising:
    a frame having a traction unit to move the frame forwardly during mowing operations;
    a forwardly extending frame member pivotably suspending a reel mower cutting unit rearwardly therefrom by a ball joint to pull the reel mower cutting unit in a forward direction so that the reel mower cutting unit follows the ground surface;
    a grass catcher hanging vertically down from a wire form extending forwardly from the ball joint; the wire form engaging a top panel of the grass catcher so the grass catcher pivots independently of the reel mower cutting unit;
    the wire form pivotable forward until reaching a stop and pivotable backward with the grass catcher, or backward without the grass catcher to a position behind the ball joint for storage or transport; and
    a rod adjacent a lower surface of the grass catcher and engaging a pair of slots in the reel mower cutting unit.

* * * * *